United States Patent [19]

Cogswell

[11] Patent Number: 4,576,139
[45] Date of Patent: Mar. 18, 1986

[54] RIGID WIRE SAW WHEEL APPARATUS FOR VERY HARD MATERIALS

[76] Inventor: Jesse G. Cogswell, 2823 Main St., Santa Monica, Calif. 90405

[21] Appl. No.: 730,869

[22] Filed: May 6, 1985

[51] Int. Cl.⁴ .............................................. B28D 1/08
[52] U.S. Cl. .................................... 125/21; 51/74 R; 83/788; 83/875
[58] Field of Search ................... 83/788, 875; 144/33; 125/21, 12; 51/73 R, 74

[56] References Cited

U.S. PATENT DOCUMENTS

| | | | |
|---|---|---|---|
| 2,780,896 | 2/1957 | Jaye | 51/74 |
| 2,948,085 | 8/1960 | Casady | 51/73 |
| 3,400,494 | 9/1968 | Seitz | 125/21 |
| 3,561,310 | 2/1971 | Deeks | 125/21 |

FOREIGN PATENT DOCUMENTS 464066  1/1951  Italy ...................................... 83/788

Primary Examiner—Harold D. Whitehead
Attorney, Agent, or Firm—Monty Koslover

[57] ABSTRACT

An apparatus for the accurate sawing of very hard materials is described, comprising a rigid circular wire saw and an assembly providing support, guidance and drive for the wire saw. A plurality of saw-guides constructed of guide wheels having a rubber circumference bearing surface, are used to support and guide the rigid circular wire saw. In the preferred embodiment, a disk shaped drive wheel, driven by an electric motor, applies frictional pressure and linear impetus to the wire saw, causing it to rotate at high speed. The apparatus may be scaled in size to accommodate any given maximum thickness of workpiece material.

13 Claims, 20 Drawing Figures

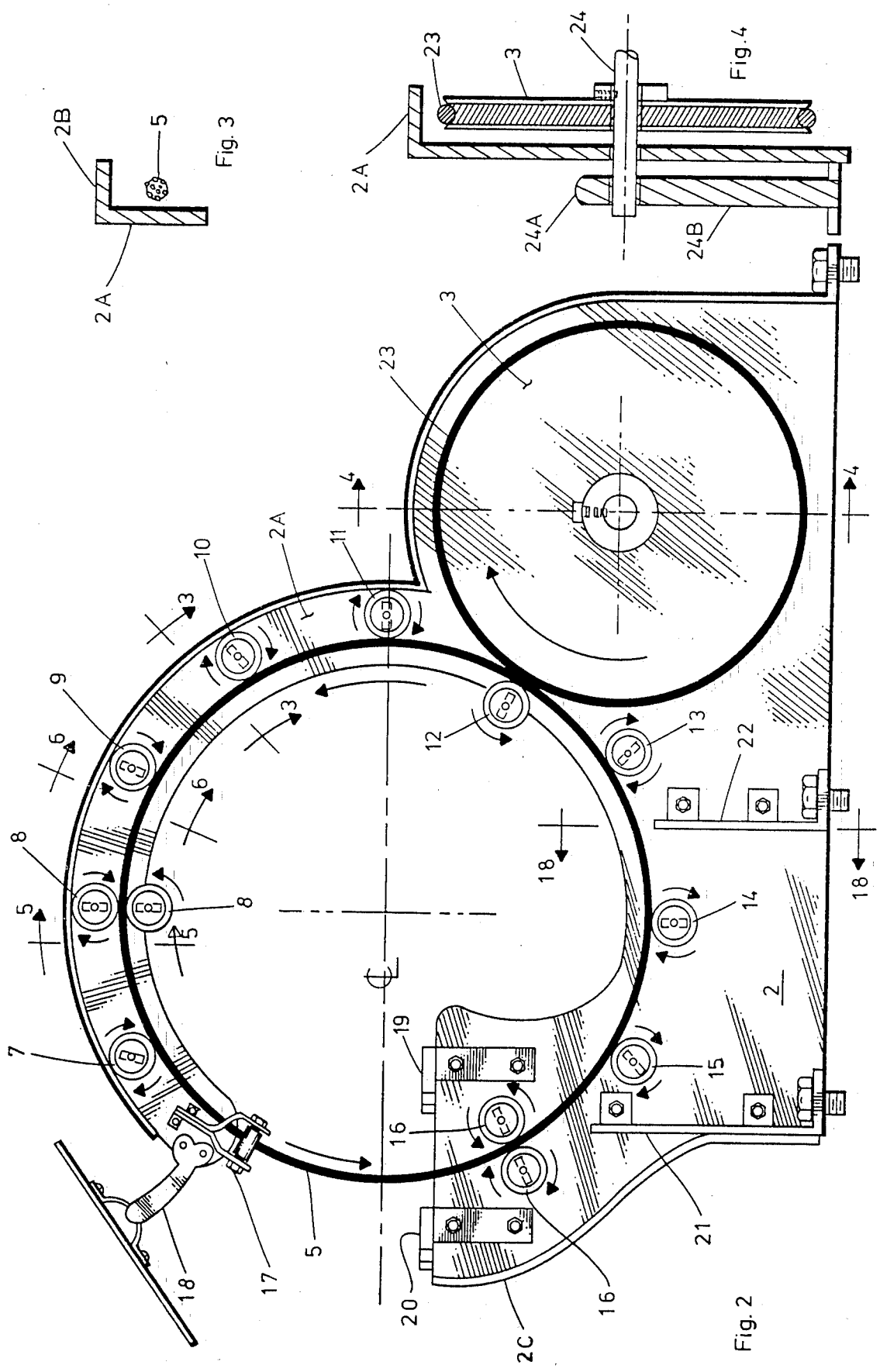

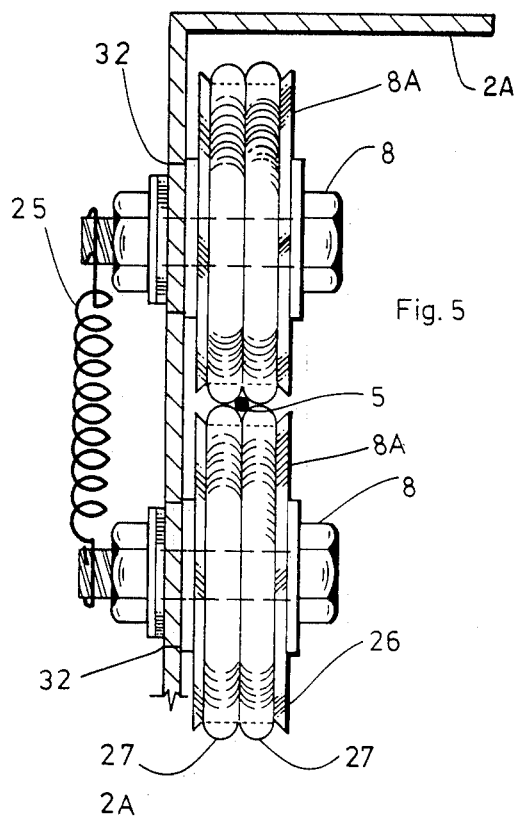
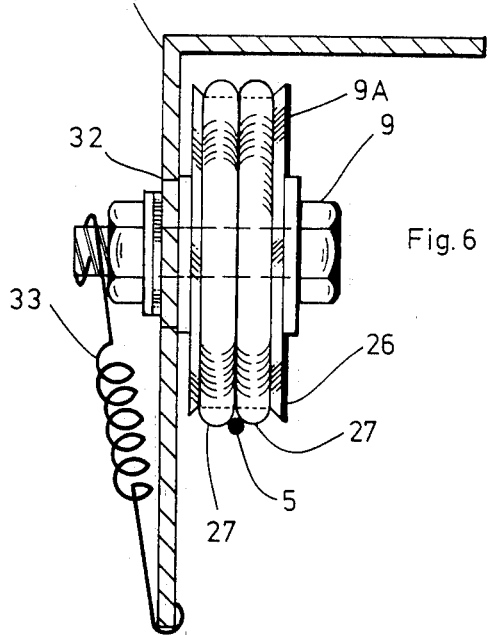
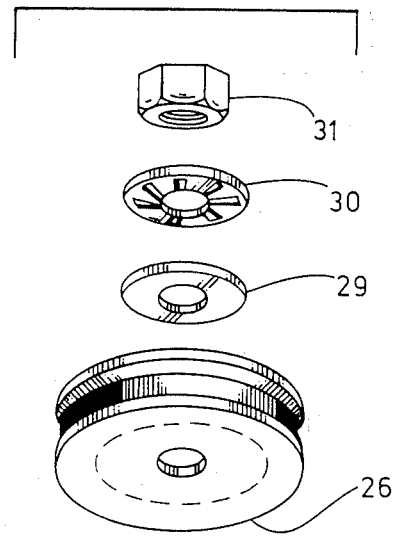
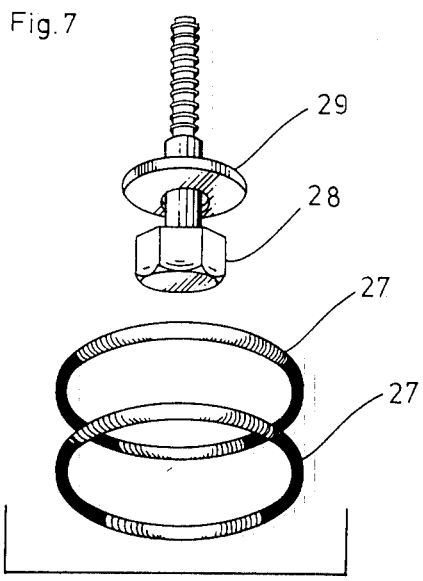
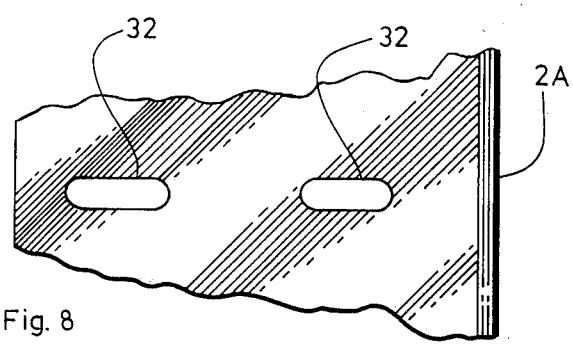

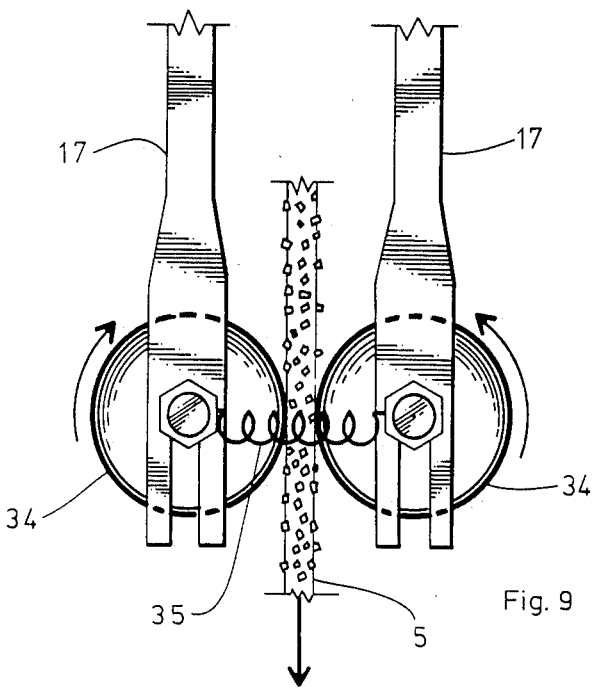
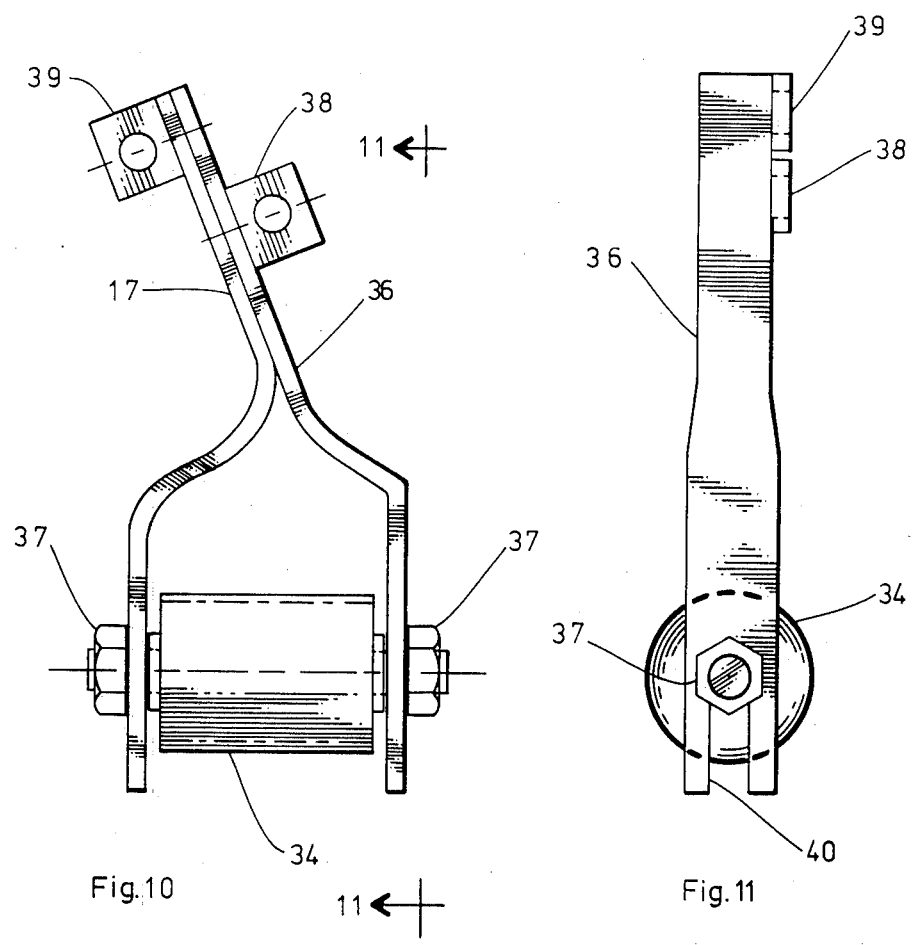
Fig. 9
Fig. 10
Fig. 11

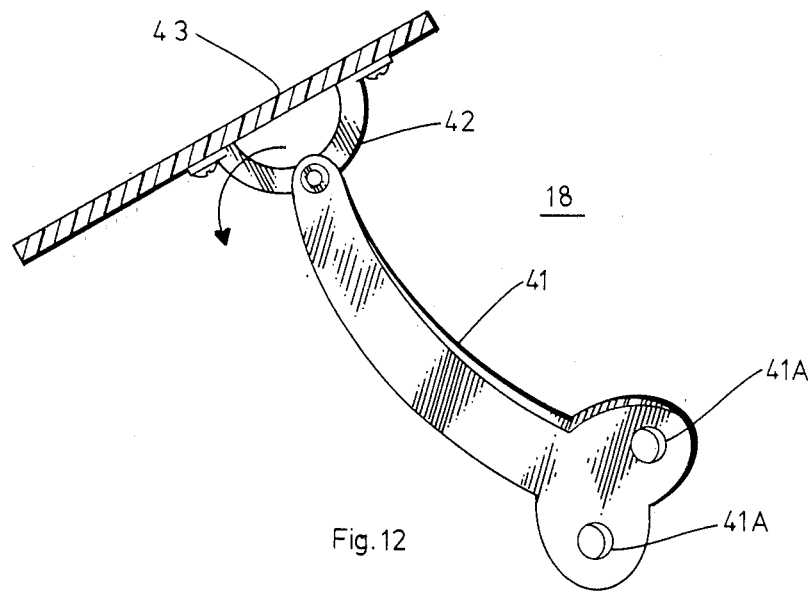
Fig. 12
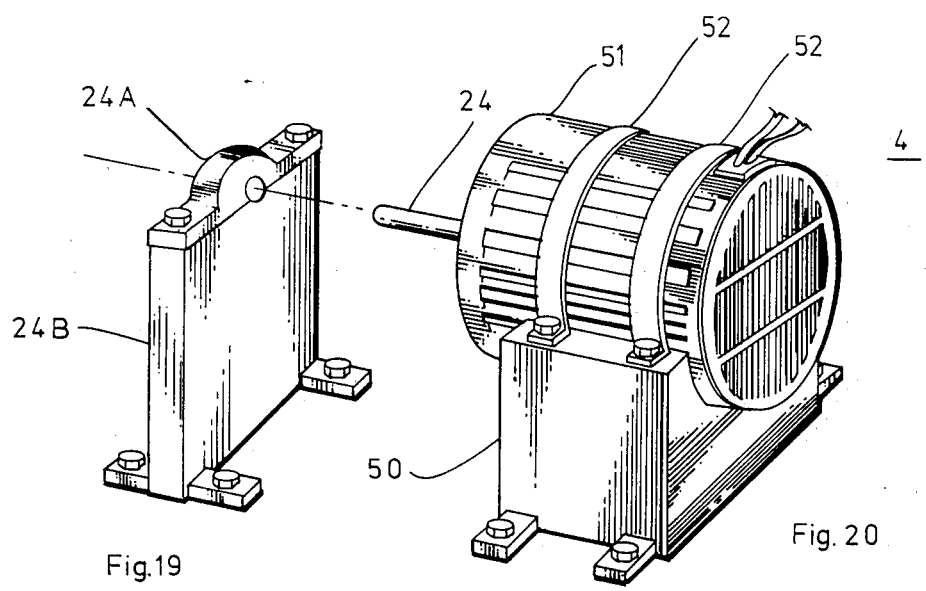
Fig. 19
Fig. 20

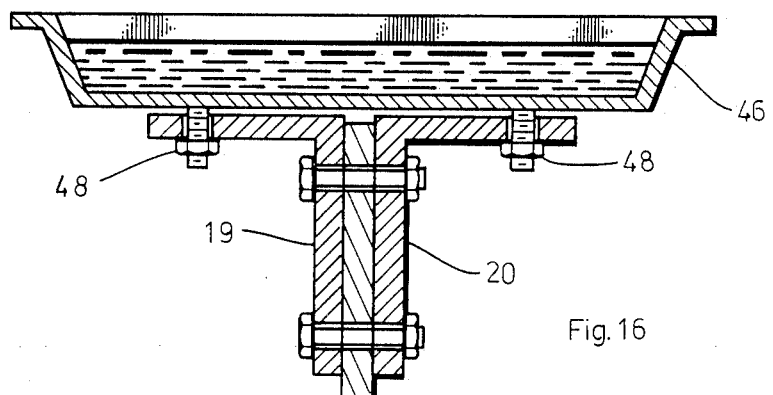
Fig. 16
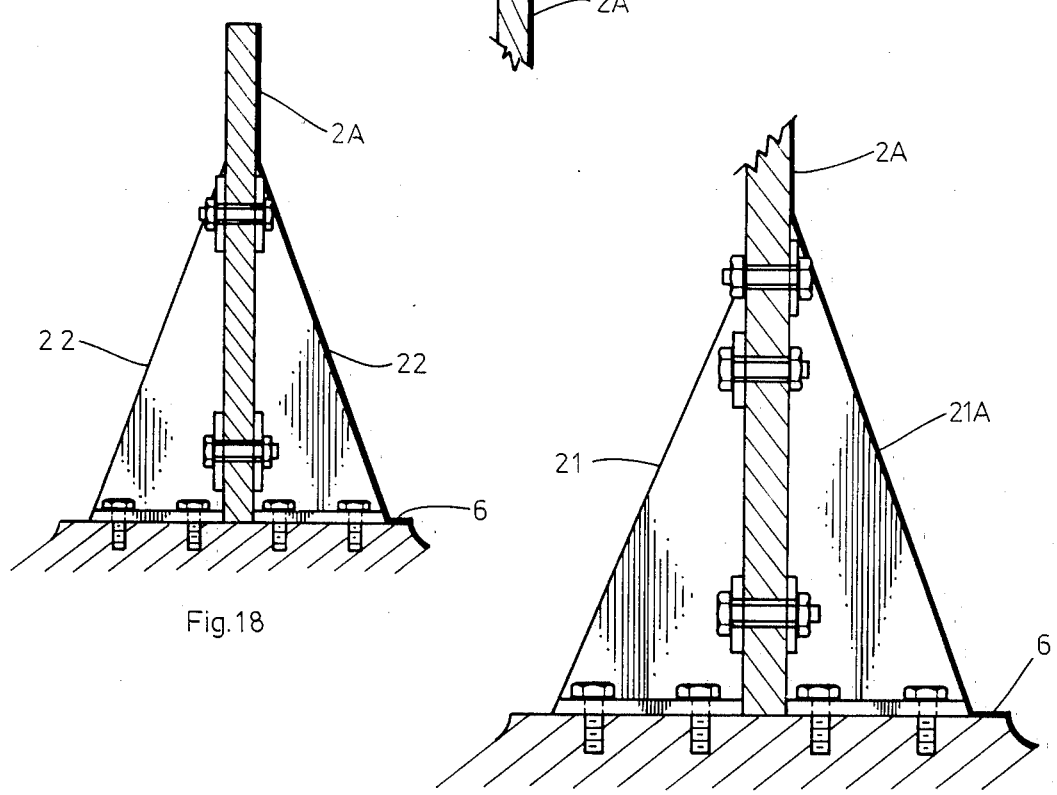
Fig. 18
Fig. 17

RIGID WIRE SAW WHEEL APPARATUS FOR VERY HARD MATERIALS

BACKGROUND OF THE INVENTION

1. Field of the Invention

This invention relates to circular saws employed for sawing very hard materials such as glass, ceramics, refractories and stone, and more particularly to a rigid circular wire saw and to an assembly for supporting, guiding and driving such.

2. Description of the Prior Art

There are no known devices utilizing a rigid circular wire saw as the cutting tool, although the prior art includes a number of devices utilizing flexible wire saws. Various methods are used for coating a wire saw with abrasives, using bonding resins, electroplating or sintering. However, in each case the wire cutting element that results is flexible. This flexibility produces problems in the use of the wire saw. Lateral flexing of the wire makes it difficult to accurately cut the hard workpiece materials, limits the wire surface speed and tends to be wasteful of abrasive material.

When used in cutting apparatus, such saws are necessarily limited to applications where extreme accuracy in following intricate shapes or patterns is not required, and allowance can be made for wasted workpiece materials. Thus, there exists a need for a device capable of the required accuracy and speed in sawing hard materials.

SUMMARY OF THE INVENTION

The invention comprises a rigid diamond coated circular wire saw, mounted vertically on a back-plate assembly, guided by saw-guide wheels and driven at high speed by frictional contact with a circular drive-wheel. A cutting table assembly is mounted horizontally on the back-plate assembly, locating the wire saw at its center, and cooling the wire with water from a sponge and liquid reservoir in the cutting table assembly.

Since the wire saw is rigid and does not flex in either the plane of rotation or laterally, thin workpieces may be moved by the operator on the cutting table surface in such a way as to generate curved or intricate shapes as desired.

Accordingly, it is a principal object of this invention to provide an apparatus which will function satisfactorily in the cutting of extremely hard materials, with accuracy and speed.

Another object is to provide a means of driving and closely guiding a rigid, diamond coated circular wire saw.

It is another object to provide a circular saw that does not suffer from the disabilities of flexing, material stresses and wear associated with prior art saws. It is yet another object to provide a device that can be scaled up and down in size, enabling it to be sized to accurately cut extremely thin or thick workpieces.

Further objects and advantages of the invention will become apparent from the study of the following portion of the specification, the claims and the attached drawings.

BRIEF DESCRIPTION OF THE DRAWINGS

FIG. 2 is a side view of the back-plate assembly as seen from the right-hand side; in this drawing, the cutting table assembly and the motor assembly are removed to show details of the wire guidance and drive system;

FIG. 3 is a cross-section view of a portion of the back-plate assembly taken along line 3—3 of FIG. 2;

FIG. 4 is a cross-section view of the back-plate assembly and drive-wheel taken along line 4—4 of FIG. 2;

FIG. 5 is a partly cross-section view of a portion of the back-plate assembly taken along line 5—5 of FIG. 2; in this view a saw-guide pair is shown adjusted in position;

FIG. 6 is a partly cross-section view of a portion of the back-plate assembly taken along line 6—6 of FIG. 2; in this view a single saw-guide is shown adjusted in position;

FIG. 7 is an exploded view of a guide wheel, two of the guide wheels being used for a saw-guide pair;

FIG. 8 is a view of the back-plate assembly immediately behind a saw-guide pair mounting, showing the typical wheel-slider apertures;

FIG. 9 is a partial front view of the two horizontal roller-guide assemblies shown engaging the rigid circular wire saw;

FIG. 10 is a plan view of a horizontal roller-guide;

FIG. 11 is a side view of a horizontal roller-guide assembly taken along line 11—11 of FIG. 10;

FIG. 12 is a view of the face shield assembly;

FIG. 16 is a cross-section view of the water tray taken along line 16—16 of FIG. 15 and mounted on the back-plate assembly;

FIG. 17 is a partly cross-section view of a lower front portion of the back-plate assembly, showing the right and left hand front support struts in position;

FIG. 18 is a partly cross-section view of a lower front portion of the back-plate assembly, taken along line 18—18 of FIG. 2, showing the side support struts in position;

FIG. 19 is a perspective view of the axle pillow block and pillow block base; and FIG. 20 is a perspective view of the electric motor, drive wheel axle and motor pillow block supporting the electric motor.

DESCRIPTION OF THE PREFERRED EMBODIMENTS

Figure 1:
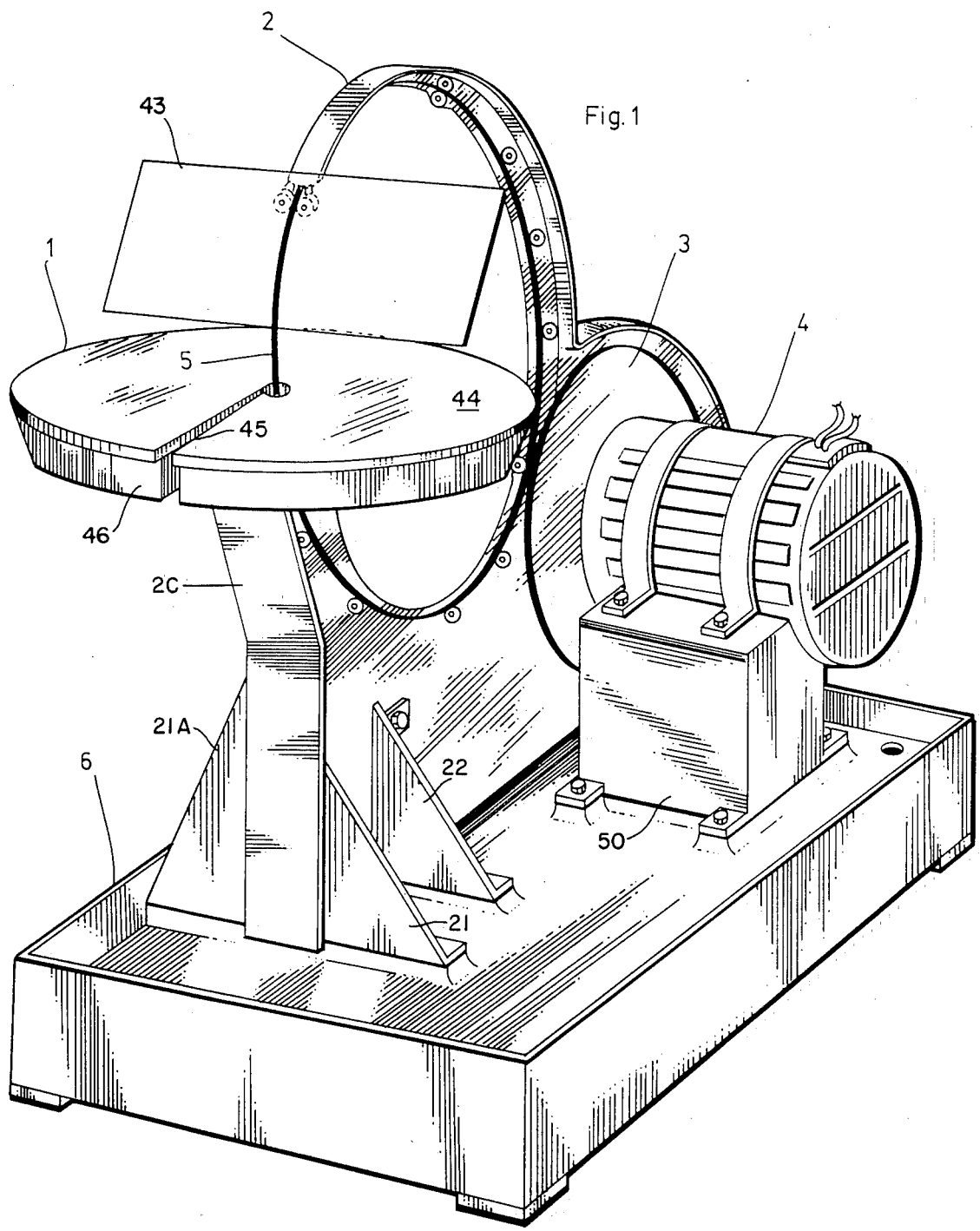
FIG. 1 is a perspective of the device illustrating the apparatus ready for a cutting operation.

Referring particularly to the drawings, there is shown in FIG. 1 a preferred embodiment of the rigid wire saw-wheel apparatus. The apparatus includes a cutting table assembly 1, a back-plate assembly 2, a drive wheel 3, a motor assembly 4, a rigid circular wire saw 5 and a base 6.

When in use, the workpiece is placed on the cutting table assembly 3 surface where it is cut by the rigid circular wire saw 5 which is driven at a high speed. As the sawing proceeds, an aqueous coolant (not shown) contained in the cutting table assembly 3, is added to the wire saw surface so as to provide the proper cooling action. The back-plate assembly 2, in addition to providing support for the wire saw-guides and drive, acts as a splatter shield and provides operator safety protection. The base 6 is configured to provide a catchment for the aqueous coolant, and is equipped with a drain hole in one corner for draining the spilled coolant if need be.

The rigid circular wire saw 5 is a closed loop, forming a perfect circle, and is comprised of a single strand of high tensile strength metal, coated along all its surfaces with fixedly secured, bonded super abrasive particles such as diamonds, cubic boron nitride and mixtures thereof. For proper cutting application, the bonded abrasive particles are required to have a Knoop hardness in excess of 3000 Kg/mm$^2$. It is essential that the rigid circular wire saw 5 have an outer cross-sectional diameter including bonded abrasive particles, of not more than 0.5 inch, and be made as rigid as possible. The peripheral diameter of the rigid circular wire saw on the other hand may be varied, and the apparatus as consequence must be made larger or smaller to accommodate it. As an example, if the diameter of the rigid circular wire saw is selected to be 8 inches, the maximum thickness of workpiece that can be cut accurately and vertically is 0.1875 inches. This corresponds to an angle of arc of 2.68 degrees. The formula for determining the required wire saw diameter D for a desired maximum workpiece thickness t is:

$$D=2(t/\text{Tan } 2.68°)$$

Using this formula, the wire saw diameter for a 0.5 inch thick workpiece would be 21.36 inches. The supporting and drive assemblies would then be sized to the circular wire saw diameter. Thus, the size of the apparatus is predicated on a selection of the desired maximum workpiece thickness and thereby the wire saw diameter. For the purpose of illustrating this embodiment, a rigid circular wire saw diameter of 8 inches is selected. The overall height of the apparatus to accommodate the wire saw will then be about 18 inches, and the equipment can be placed on a table top.

The rigid circular wire saw wheel depicted in FIG. 1 is preferably constructed as described in the following discussion:

Referring specifically to FIGS. 2, 3 and 4, there are shown a right-hand side view of the back-plate assembly 2 and two cross-sectional views of the back-plate assembly taken at lines 3—3 and 4—4 of FIG. 2. The drive wheel 3 and the rigid circular wire saw 5 are shown in place for clarity, however, they are not part of the back-plate assembly. The back-plate assembly comprises the following components: the back-plate 2A, the right-hand front support strut 21 and the left-hand front support strut 21A, two side support struts 22, the face shield assembly 18, two horizontal roller-guides 17, two first water tray bracket supports 19, two second water tray bracket supports 20, and a plurality of saw-guides 7, 8, 9, 10, 11, 12, 13, 14, 15 and 16.

The back-plate 2A is made of any suitable rigid material such as aluminum. A portion of the back-plate 2A is formed in an arc as depicted in FIG. 2 to form a saw shield. The top section is made rigid as shown in FIG. 3, by addition of an angle portion 2B along its top edge. Except for the angle portion, the surface of the back-plate is quite flat. The four support struts 21, 21A, 22A, 22B, are fastened by bolts to the back-plate 2A to provide support. This is depicted in FIGS. 17 and 18. A flat strip splatter shield 2C, is attached to the front edge of the back-plate as shown in FIG. 2.

Referring to FIG. 2 and FIG. 4, the drive wheel 3 is shown mounted in position, and bearing against the rigid circular wire saw 5. The drive wheel 3 is a disk of rigid material such as aluminum, having a protuberance shaped as a hub located at its center of rotation, and having an axle hole bored at its center perpendicular to the disk surface. Provision is made on the drive wheel hub for fastening the drive wheel 3 to the drive wheel axle 24. The drive wheel 3 is shaped with a groove on its outer circumference, sufficiently deep to seat a large rubber "O" ring 23. When the "O" ring 23 is in position on the drive wheel, it forms the frictional rotating surface which bears on the rigid circular wire saw 5, rotating the wire saw at high speed. The drive wheel 3 rotational speed is typically selected as 1700 rpm, and sized so that its circumferential linear speed is 3000 feet per minute or more. The linear speed of the rigid circular wire saw will thus also be 3000 feet per minute more. This speed is desirable for satisfactory cutting action, however, it requires that the rigid circular wire saw be closely supported and guided along most of its circumference. This function is performed by the plurality of saw-guides.

Referring again to FIG. 2, a total of eight single saw-guides and two saw-guide pairs are utilized in the preferred embodiment. A 1st single saw-guide 7 is located on the back-plate 2A at an angle of 120 deg., with respect to the center line and center of the rigid circular wire saw 5. A 1st saw-guide pair 8 is located on the back-plate 2A at an angle of 90 deg. A 2nd single saw-guide 9 is located on the back-plate 2A at an angle of 60 deg. A 3rd single saw-guide 10 is located on the back-plate 2A at an angle of 30 deg. A 4th single saw-guide is located on the back-plate 2A at an angle of 0 deg. A 5th single saw-guide is located on the back-plate 2A at an angle of 330 deg., directly on a radial from the drive-wheel 3 center, so that the rigid circular wire saw is held between the 5th single saw-guide and the drive wheel "O" ring 23. A 6th single saw-guide is located on the lower portion of the back-plate 2A at an angle of 300 deg. A 7th single saw-guide is located on the lower portion of the back-plate at an angle of 270 deg. An 8th single saw-guide is located on the lower portion of the back-plate 2A at an angle of 240 deg. A 2nd saw-guide pair is located on the lower portion of the back-plate 2A at an angle of 210 deg.

In addition to the plurality of saw-guides located as described, there are utilized two horizontal roller-guides 17 which are fastened to both sides of the back-plate 2A at the front of the apparatus, so that the rollers are located at an angle of 150 deg. Referring to FIGS. 5 and 6, a 1st saw-guide pair 8 and a 2nd single saw-guide 9 are depicted in position on the back-plate 2A. The arrangements shown are typical for the saw-guide pairs and the single saw-guides. The 1st saw-guide pair 8 comprises two identical guide wheels 8A and a 1st tension spring. Each guide wheel 8A is attached to the back-plate 2A through wheel-slider apertures 32 in the back-plate 2A. A 1st tension spring 25 attached to both guide wheels, is used to locate the wheels so as to apply pressure on the rigid circular wire saw 5. The guide wheels 8A are then fastened in position by nuts after the initial adjustment. Similarly, in the arrangement of the 2nd single saw-guide 9 depicted in FIG. 6, the guide wheel 9A is attached to the back-plate 2A through a wheel-slider aperture 32. A 2nd tension spring 33 attached between the guide wheel 9A and the lower rim of the back-plate 2A, locates the wheel so as to apply pressure on the rigid circular wire saw 5. The guide wheel 9A is then fastened in position by a nut after the initial adjustment.

It should be noted in FIGS. 5 and 6, that the frictional surface of the guide wheels brought to bear on the rigid circular wire saw, is formed of two rubber "O" rings 27. The rotating movement allows contact with the abrasive surface of the rigid circular wire saw for a reasonable working life prior to replacement. The use of rubber (or similar resilient material) permits close guidance of the wire saw while minimizing induced stresses in the wire saw due to pressure at high speed.

FIG. 7 is an exploded view of a guide wheel 8A or 9A. The assembly is typical for all the guide wheels used in the saw-guide pairs and single saw-guides. The guide wheel comprises a bearing wheel 26 containing sealed roller bearings and having circumferential grooves, two rubber "O" rings 27, a shoulder bolt 28, washer 29, lockwasher 30, and nut 31. The rubber "O" rings 27 are sized to fit tightly together in the circumferential groove of the bearing wheel 26. The bearing wheel 26 may be made of aluminum, steel or a suitable molded plastic.

FIG. 8 shows the shape of the wheel-slider apertures 32 which are located on the back-plate 2A portion of the back-plate assembly 2, at angles corresponding to the location of each saw-guide, either single or pair. Two such wheel-slider apertures 32 are placed for a saw-guide pair and one wheel-slider aperture for each single saw-guide. The wheel-slider apertures 32 are sized to allow substantial movement up or down, of the guide wheels in the apertures. This allows for adjustment of the guide wheel position in contact with the rigid circular wire saw 5. It also allows for easy removal and installation of the rigid circular wire saw 5.

Referring now to FIG. 9, a partial front view of the two horizontal roller-guides 17 is shown. The rigid circular wire saw 5, passes between the two rollers 34 of the horizontal roller-guides, where it is engaged prior to the rotating saw surface coming into contact with the workpiece. The rollers 34 are held in contact with the surface by a 3rd tension spring 35, which is fastened to each of the horizontal roller-guides 17.

FIG. 10 is a plan view of a horizontal roller-guide 17, and FIG. 11 depicts a side view taken along line 11—11 of the FIG. 10 illustration. Two horizontal roller-guides 17 are utilized in this embodiment. A horizontal roller-guide 17 comprises a roller 34, a roller guide support 36, and two locking nuts 37. In this embodiment, the roller guide support 36 is shown made of two pieces of metal which are welded or otherwise fastened together. The roller guide support 36 may also be molded on one single piece in the shape shown in FIG. 10. Two tabs 38 and 39 are provided for fastening the horizontal roller-guide to the back-plate assembly. Adjustment slots 40 are provided in each leg of the roller-guide support 36 to enable installation and removal of the roller 34. The roller 34 contains sealed roller bearings and is coated on its rotating outer surface with a rubber or resilient material.

Referring to FIG. 12, there is shown a side view of the face shield assembly 18. The assembly comprises a shield arm 41, a shield holder 42 and a face shield 43. The shield holder 42 is fastened to the face shield 43 by screws, and pivots on a locking screw and nut through a hole in the end of shield arm 41 allowing adjustment of the face shield angle. Two holes 41A are located on the shield arm 41 for the purpose of fastening the shield arm to the back-plate 2A. The face shield 43 is preferentially of clear plexiglass. The shield holder 42 and shield arm 41 may be made of any rigid material such as aluminum.

Figure 13:
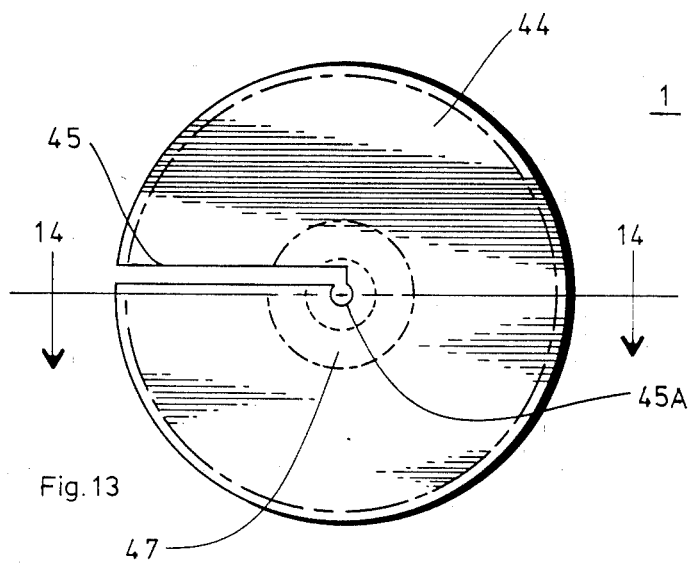
FIG. 13 is a top plan view of the cutting table assembly.
Figure 14:
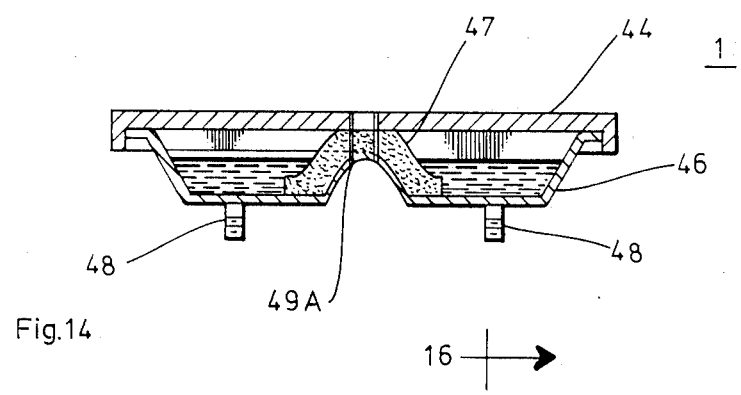
FIG. 14 is a cross-section view of the cutting table assembly, taken along line 14—14 of FIG. 13.
Figure 15:
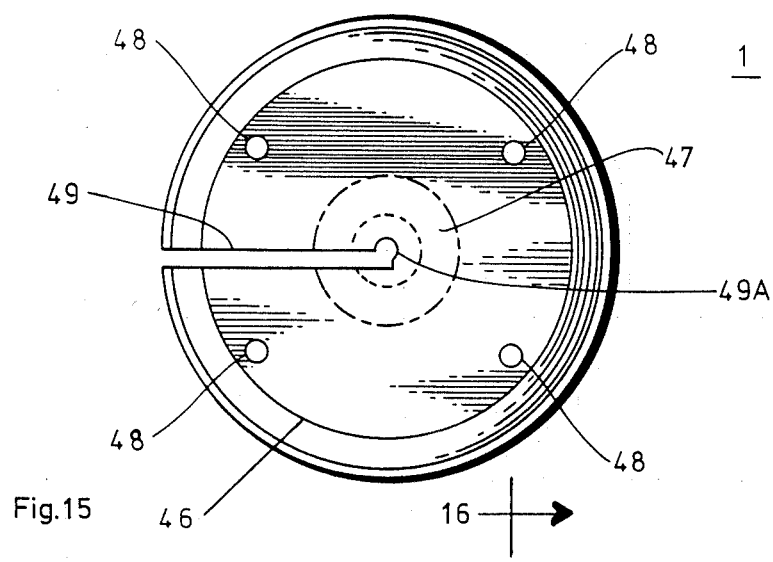
FIG. 15 is a plan view looking at the bottom of the water tray.

The cutting table assembly 1 is depicted in three views in FIGS. 13, 14 and 15. In the preferred embodiment, the cutting table assembly 1 comprises a cutting table 44, a water tray 46 and a sponge 47. The liquid in the water tray may be water or a suitable aqueous coolant. Referring to FIG. 13, there is shown a top plan view of the cutting table 44. A hole 45A is located in the center of the cutting table 44 for the rigid circular wire saw 5. Communicating with the hole 45A is a table slot 45 offset by one half inch from a radius. The slot permits location of the rigid circular wire saw 5 at the center of the cutting table 44, and installation or removal in place of the cutting table 44. The cutting table 44 is of a rigid material and shaped to fit closely over water tray 46.

Referring to FIG. 14, there is shown a cross-section view of the cutting table assembly, taken along line 14—14 of FIG. 13. The water tray 46 is shaped so that its bottom surface is raised at the center to form a cavity. The height of the raised protuberance in the center of the water tray 46, is sufficient to maintain a quantity of water or other coolant within the water tray, while permitting a hole 49A in its center for the rigid circular wire saw 5. A circular shaped sponge 47, having a hold in its center is located in the water tray 46 as shown in FIGS. 13, 14 and 15. The sponge transfers the liquid coolant to the surface of the rigid circular wire saw 5 when in operation.

FIG. 15 shows a plan view of the bottom of the water tray 46. A hole 49A is located in the center of the water tray 46 for the rigid circular wire saw 5. Communicating with the hole 49A is a water tray slot 49 offset by one half inch from a radius. This slot 49 corresponds to the slot described for the cutting table 44, and lines up with the cutting table slot 45 when the water tray and cutting table are assembled. On the bottom of the water tray 46, and either fastened to it or molded to it, are four fastening studs 48, located on flat portions of the water tray and approximately equidistant. The fastening studs 48 are threaded to receive a nut, which is used to secure the water tray to the water tray bracket supports 19 and 20. In FIG. 16 the water tray 46 is depicted in cross section view taken alone line 16—16 of FIG. 15. It is mounted on the four water tray bracket supports 19 and 20, two of which are shown in this view. The water tray bracket supports 19 and 20, are in turn fastened by bolts and nuts to the back-plate 2A. The water tray bracket supports 19 and 20 are located and fastened in such a way to the back-plate assembly shown in FIG. 2, that when placed on the water tray bracket supports, the cutting table assembly 1 top surface, i.e., the cutting table 44, is located below the center line by the maximum thickness of the workpiece. Thus if the maximum workpiece thickness is 0.125 inches, the cutting table surface must be no more than 0.125 inches below the center line k, shown in FIG. 2. This ensures that the cut in the workpiece will be vertical.

Referring to FIGS. 17 and 18, these show the right-hand front support strut 21, the left-hand front support strut 21A, and the two side support struts 22, fastened to the back-plate 2A, and to the base 6. Both side support struts 22 are mirror images of each other, enabling fastening to each other through the lower back-plate 2A. The right-hand front support strut 21 is made to be shorter in height than the left-hand support strut 21A, and is otherwise a mirror image of the left-hand support strut 21. All four struts may be made of any rigid material such as aluminum.

Referring lastly to FIGS. 19 and 20, there is shown in FIG. 20 a perspective view of the motor assembly 4, comprising an electric motor 51, a drive wheel axle 24 which is connected to the axis of the electric motor 51, a motor pillow block 50 and motor fastening bands 52 which fasten electric motor 51 to motor pillow block 50. Motor pillow block 50 is in turned fastened by bolts to the base 6. FIG. 19 is a perspective view of the axle pillow block 24A and axle pillow block base 24B shown in cross-section view in FIG. 4. Drive wheel axle 24, to which drive wheel 3 is connected, is supported at its end by axle pillow block base 24B, and secured by axle pillow block 24A.

From the above description, it is apparent that the preferred embodiment achieves the objects of the present invention. Alternative embodiments and various modifications of the embodiments depicted will be apparent from the above description to those skilled in the art. These and other alternatives are considered to be equivalent and within the spirit and scope of the present invention.

Having described the invention, what is claimed is:

1. Aparatus for sawing particularly hard materials, such as glass, ceramics, refractories and stone, the apparatus comprising:
   (a) a base;
   (b) a back-plate assembly mounted on said base, said back-plate assembly comprising a back-plate, front support struts and side support struts, a face shield assembly, water tray bracket supports, horizontal roller-guides and a plurality of saw-guides, said back-plate assembly acting as a splatter shield and providing operator safety protection;
   (c) a rigid circular wire saw comprising a single strand of high tensile strength metal and coated with fixedly secured bonded super-abrasive particles such as diamonds, cubic boron nitride and mixtures thereof, said rigid circular wire saw being mounted on said back-plate assembly and guided by said saw-guides, so that when being rotated at its operating high speed, said rigid circular wire saw will abrade a workpiece brought into abrading contact therewith;
   (d) means for driving said rigid circular wire saw, causing it to rotate at high speed;
   (e) a motor assembly;
   (f) means for wetting and cooling said rigid circular wire saw, providing a surface for supporting and locating the workpiece.

2. The apparatus as defined in claim 1 wherein:
said back-plate may be fabricated of any rigid material such as aluminum to which other assemblies and components comprising said back-plate assembly can be attached, said back-plate having wheel slider apertures on its saw shield portion, located at angles of 0 deg., 30 deg., 90 deg., 120 deg., 210 deg., 240 deg., 270 deg. 300 deg., and 330 deg., said wheel slider apertures establishing the location of said plurality of saw-guides and providing for their adjustment, said back-plate having located and fastened on it at an angle of 150 deg., (the front) two horizontal roller-guides which have the function of guiding and retaining the rigid circular wire saw just prior to its engaging the workpiece.

3. The apparatus as defined in claim 2 wherein:
said plurality of saw-guides comprise two types: a saw-guide pair and a single saw-guide, there being at least two saw-guide pairs and a plurality of single saw-guides in this embodiment, said saw-guide pair providing pressure simultaneously against the inner and outer perimeters of said rigid circular wire saw, and single saw-guide applying pressure against the outer perimeter of said rigid circular wire saw.

4. The apparatus as defined in claim 3 wherein:
said saw-guide pair comprises two guide wheels and a first tension spring, said guide wheels attached to said back-plate through said wheel slider apertures, said first tension spring attached to both said guide wheels facilitating the application of pressure by said guide wheels on said rigid circular wire saw, said guide wheels being fastened by nuts to said back-plate after initial adjustment.

5. The apparatus as defined in claim 3 wherein:
said single saw-guide comprises a guide wheel identical to that used for the saw-guide pair and a second tension spring, said guide wheel attached to said back-plate through said wheel slider aperture, said second tension spring attached to said guide wheel and to the lower rim of said back-plate, thereby applying pressure to the outer perimeter of said rigid circular wire saw, said guide wheel being fastened to said back-plate by a nut after initial adjustment.

6. The guide wheel of claim 4 wherein:
said guide wheel comprises a bearing wheel containing sealed roller-bearings and having circumferential grooves, two rubber "O" rings, a shoulder bolt, lockwasher, washer and nut, said rubber "O" rings placed tightly on said bearing wheel circumferential grooves so that said rubber "O" rings form the frictional surface of said bearing wheel, allowing contact with said rigid circular wire saw.

7. The apparatus as defined in claim 1 wherein:
said rigid circular wire saw is a closed loop forming a perfect circle rigidly resistant to deformation, said rigid circular wire saw has an outer cross-sectional diameter including bonded abrasive particles, of not more than 0.5 inch, said bonded abrasive particles having a Knoop hardness in excess of 3000 Kg/mm$^2$.

8. The apparatus as defined in claim 1 wherein:
said means for driving said rigid circular wire saw includes a drive wheel comprised of a disk and a large rubber "O" ring, said disk being made of a rigid material and shaped having a protuberance located at its center of rotation, said protuberance having an axle hole bored at its center and perpendicular to the disk surface, said disk having a groove on its outer circumference upon which said large rubber "O" ring is tightly seated, forming the frictional rotating surface which bears on and applies linear impetus to said rigid circular wire saw, causing it to rotate at high speed.

9. The apparatus as defined in claim 1 wherein:
said motor assembly comprises an electric motor, a drive wheel axle which is connected to the axis of said electric motor, an axle pillow block which supports said drive wheel axle, and a motor pillow block which supports said electric motor, the whole motor assembly being fastened to said base, providing the electromotive force for said means for driving said rigid circular wire saw.

10. The apparatus as defined in claim 1 wherein:
said means for wetting and cooling said rigid circular saw includes a water tray which is mounted to and supported by said back-plate assembly; a circular shaped sponge is located at the center of said water tray in such a way as to impinge on said rigid circular wire saw, transferring cooling water to its surface;
said water tray being shaped with its bottom surface raised at the center to form a cavity, sufficient to maintain water within said water tray, having a central hole for the wire saw and a tray slot for placing said water tray in its proper location on the apparatus;
said water tray having fastening studs on its bottom surface for the purpose of fastening said water tray to water tray bracket supports which are in turn fastened to said back-plate assembly; and a cutting table of rigid material, circular in shape, shaped to fit closely over said water tray.

11. The cutting table of claim 10 wherein:
said cutting table has a hole in its center communicating with a table slot offset by one half inch from a radius, said hole and table slot permitting said rigid circular wire saw to be located at the cutting table center, and to allow assembly in place or removal of said cutting table.

12. The horizontal roller-guide of claim 2 wherein:
said horizontal roller-guide comprises a roller containing sealed roller-bearings, a roller-guide support and fastening nuts, said roller being coated on its rotating outer surface with a rubber or resilient material.

13. The horizontal roller-guide of claim 12 wherein:
said roller is fastened to a second roller of a second horizontal roller-guide, by a third tension spring, thereby applying pressure to and retaining the rigid circular wire saw just prior to its engaging the workpiece.

* * * * *